US008294780B2

United States Patent
Chang

(10) Patent No.: US 8,294,780 B2
(45) Date of Patent: Oct. 23, 2012

(54) PORTABLE ELECTRONIC DEVICE EMPLOYING CAMERA MODULES HAVING DIFFERENT FOCAL LENGTHS

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 401 days.

(21) Appl. No.: 12/547,670

(22) Filed: Aug. 26, 2009

(65) Prior Publication Data
US 2010/0165120 A1 Jul. 1, 2010

(30) Foreign Application Priority Data
Dec. 27, 2008 (CN) .......................... 2008 1 0306593

(51) Int. Cl.
*H04N 5/228* (2006.01)
(52) U.S. Cl. ..................................... 348/222.1; 348/376
(58) Field of Classification Search .......................... None
See application file for complete search history.

(56) References Cited

U.S. PATENT DOCUMENTS

| | | | | |
|---|---|---|---|---|
| 6,101,334 A * | 8/2000 | Fantone | | 396/72 |
| 7,518,641 B2 * | 4/2009 | Mashitani et al. | | 348/231.6 |
| 7,795,577 B2 * | 9/2010 | Olsen et al. | | 250/239 |
| 2002/0126396 A1 * | 9/2002 | Dolgoff | | 359/743 |
| 2005/0046740 A1 * | 3/2005 | Davis | | 348/373 |
| 2006/0098968 A1 * | 5/2006 | Ito et al. | | 396/85 |
| 2008/0218612 A1 | 9/2008 | Border et al. | | |
| 2009/0005112 A1 * | 1/2009 | Sorek et al. | | 455/556.2 |

\* cited by examiner

*Primary Examiner* — Chieh M Fan
*Assistant Examiner* — Angel L Garces-Rivera
(74) *Attorney, Agent, or Firm* — Altis Law Group, Inc.

(57) ABSTRACT

An exemplary portable electronic device includes a main body, camera modules, a storage unit for storing images, and an image processing unit. The camera modules are accommodated in the main body and exposed the ambient environment. The camera modules have different focal lengths from each other, and are configured for simultaneously picking up images of an object. The image processing unit is electrically connected with the camera modules. The image processing unit is configured for comparing the modulation transfer function (MTF) values of the images, and transmitting data of the image having the greatest MTF value to the storage unit.

16 Claims, 2 Drawing Sheets

PORTABLE ELECTRONIC DEVICE EMPLOYING CAMERA MODULES HAVING DIFFERENT FOCAL LENGTHS

BACKGROUND

1. Technical Field

The present disclosure relates to portable electronic devices, and particularly relates to a portable electronic device employing at least two camera modules having different focal lengths from each other.

2. Description of Related Art

Zoom lens modules are widely used in portable electronic devices such as cell phones, cameras, and notebook computers. A zoom lens module generally employs an actuator such as a voice coil motor to move a lens or lenses relative to an image sensor, thereby varying a distance between the lens or lenses and the image sensor to obtain a desired focal length.

However, the actuators typically have a complicated structure and are relatively large in volume. An actuator installed to provide movement of the lens or lenses militates against the trend toward miniaturization of portable electronic devices.

Therefore, it is desirable to develop a portable electronic device which can overcome the problems described.

BRIEF DESCRIPTION OF THE DRAWINGS

Many aspects of the present portable electronic device can be better understood with reference to the following drawings. The components in the drawings are not necessarily drawn to scale, the emphasis instead being placed upon clearly illustrating the principles of the embodiments illustrated. Moreover, in the drawings, like reference numerals designate corresponding parts throughout the different views.

DETAILED DESCRIPTION

Figure 1:
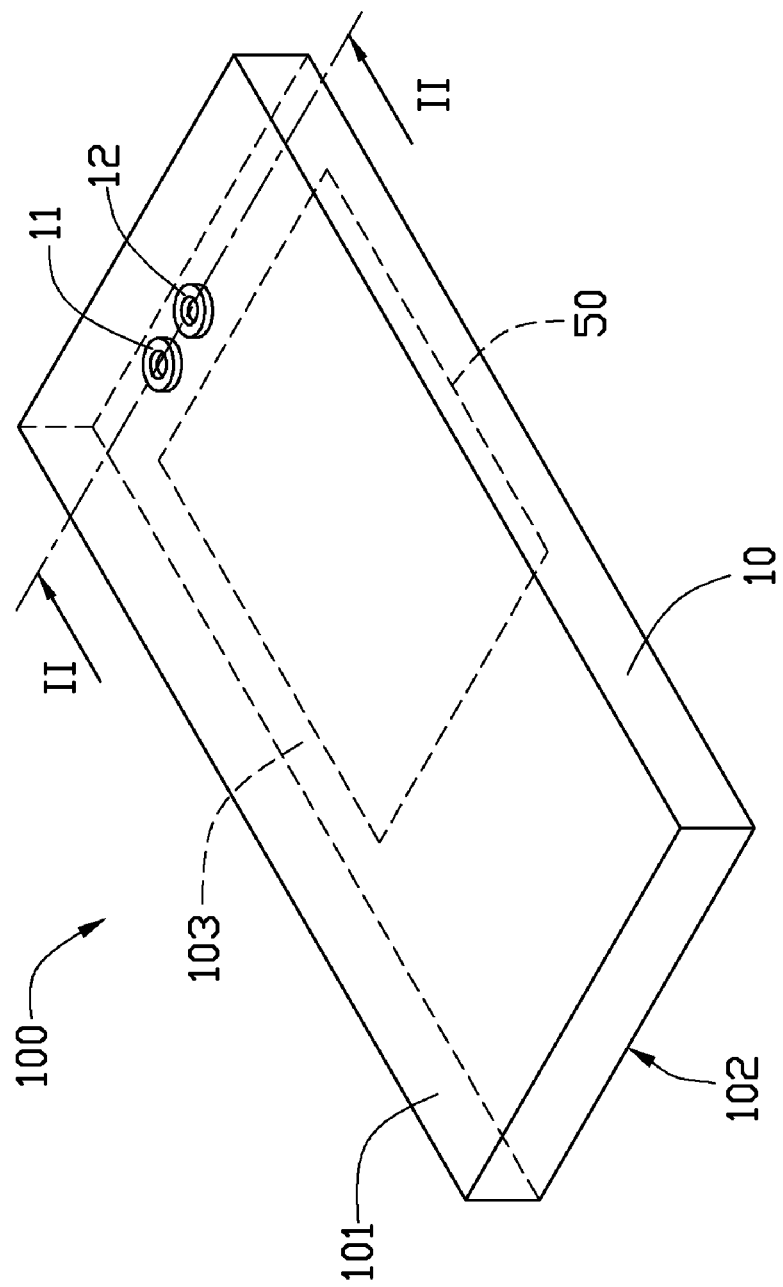
FIG. 1 is a schematic, isometric view of a portable electronic device in accordance with an exemplary embodiment, showing the portable electronic device inverted.
Figure 2:
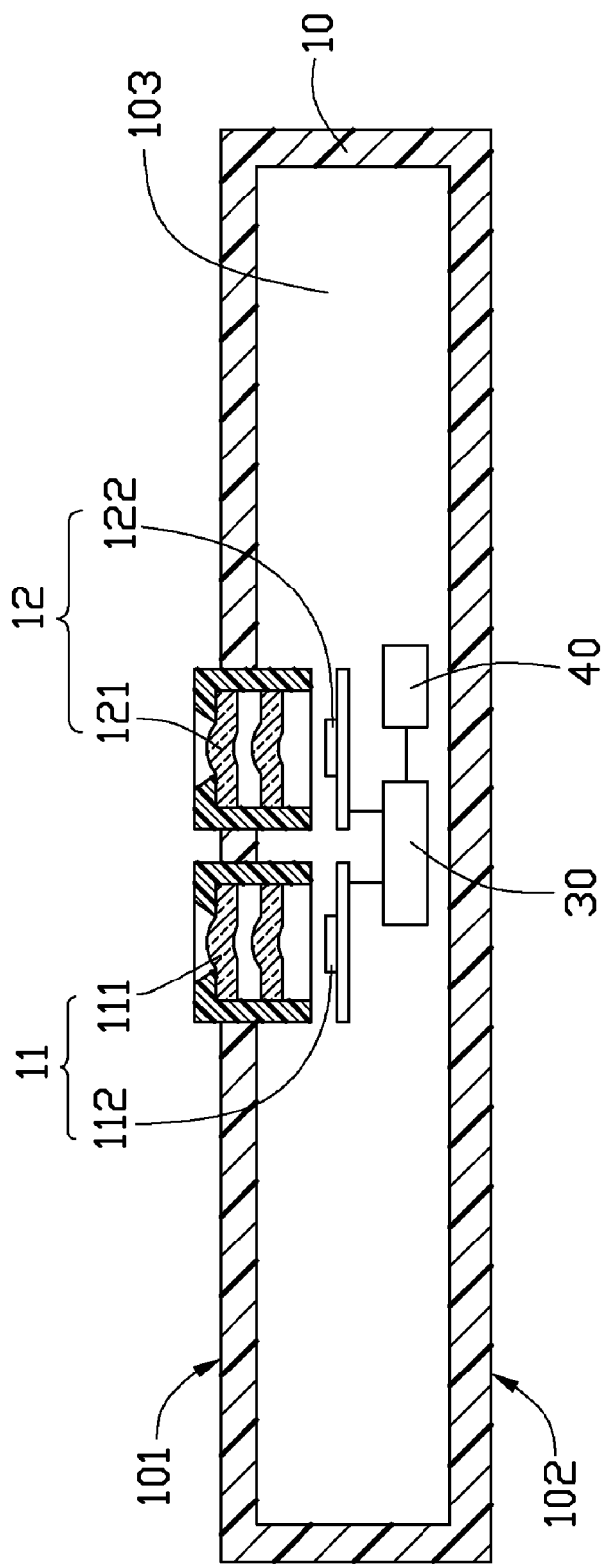
FIG. 2 is a cross-sectional view taken along line II-II of FIG. 1.

Referring to FIGS. 1 and 2, a portable electronic device 100 (e.g., a cell phone, a notebook computer, or a personal digital assistant) provided in an exemplary embodiment includes a main body 10. In addition, a first camera module 11, a second camera module 12, an image processing unit 30, a storage unit 40, and a display 50 are received in the main body 10.

In the present embodiment, the main body 10 has a first outer surface 101 and a second outer surface 102 at opposite sides thereof, and defines a room 103 therein for accommodating the image processing unit 30, the storage unit 40, and an inner part of the display 50. The main body 10 also defines two first through holes (not labeled) each spanning from the first outer surface 101 to the room 103. The first camera module 11 and the second camera module 12 are received in the first through holes, and are exposed to an environment of the portable electronic device 100. The main body 10 further defines a second through hole (not shown) spanning from the second outer surface 102 to the room 103. An outer part of the display 50 is received in the second through hole, so that the display 50 is exposed to the environment of the portable electronic device 100. In other words, the first camera module 11 and the second camera module 12 are at the same side of the main body 10, and the display 50 is at the opposite side of the main body 10. However, it is understood that in alternative embodiments, the first camera module 11, the second camera module 12 and the display 50 can all be at the same side of the main body 10.

Referring to FIG. 2, the first camera module 11 includes two first lenses 111, and a first image sensor 112 opposite to a top one of the first lenses 111. The second camera module 12 includes two second lenses 121, and a second image sensor 122 opposite to a top one of the second lenses 121. The first camera module 11 and the second camera module 12 may be standard camera modules known in the art, and so are not described in detail herein. In one embodiment, the first and second camera modules 11, 12 have different focal lengths. In the present embodiment, the first camera module 11 and the second camera module 12 are standard lens modules. The depth of field (DOF) of the first camera module 11 is from infinity to 60 centimeters, and the DOF of the second camera module 12 is from 40 cm to 20 cm. The first image sensor 112 and the second image sensor 122 are respectively configured for transforming light passing through the first and second lens 111, 121 into electronic signals, and transmitting the electronic signals to the image processing unit 30. The first and second image sensors 112, 122 are typically charge coupled devices (CCDs) or complementary metal oxide semiconductors (CMOSs).

The image processing unit 30 is electrically connected to the first image sensor 112 and the second image sensor 122. The image processing unit 30 is configured for forming two images according to digital signals transmitted from the first and second image sensors 112, 122, comparing the modulation transfer function (MTF) values of the images, and transmitting only data of the image having the greatest MTF value to the storage unit 40.

The storage unit 40 is a cache electrically connected to the image processing unit 30. The storage unit 40 is used for storing the data of the image having the largest MTF value, and transferring the data of the image to the display 50. Thereby, an operator of the portable electronic device 100 can view various images anytime, and selectively delete or store any of the images. In a typical embodiment, the storage unit 40, the image processing unit 30, and the first and second image sensors 112, 122 are fixed on a printed circuit board (not shown) accommodated in the main body 10. Alternatively, the storage unit 40 can be a storage card which is removable from the main body 10.

Furthermore, there can be more than two camera modules. For instance, three camera modules may be included in the main body 10. Depths of field of the three camera modules can be infinity to 60 cm, 40 cm to 20 cm, and 20 cm to 10 cm, respectively. In such case, the object length is greater than or equal to 10 cm. In another embodiment, depths of field of the first and second camera modules 11, 12 can be selected from the group consisting of infinity to 60 cm, 40 cm to 20 cm, and 20 cm to 10 cm. In still another embodiment, the display 50 is omitted.

In summary, in use of the portable electronic device 100, the first and second camera modules 11, 12 simultaneously capture images of the same object. Then, MTF values of the captured images are compared by the image processing unit 30, and the image having the greatest MTF value is stored in the storage unit 40. In this manner, the portable electronic device 100 is capable of capturing images which are focused without employing any actuator to change the distances between the lenses 111, 121 and the corresponding image sensors 112, 122. That is, the portable electronic device 100 can obtain images comparable to an image-taking device having auto-focus capability, yet without the need for a lens actuator. Therefore, the portable electronic device 100 can be made compact while still providing good image quality.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A portable electronic device, comprising:
a main body;
a plurality of camera modules accommodated in the main body and exposed to an environment of the portable electronic device;
a storage unit;
a display received in the main body and exposed to the environment of the portable electronic device; and
an image processing unit;
wherein the camera modules have different focal lengths from each other, are configured for simultaneously picking up images of an object, and comprise a first camera module and a second camera module, and the depths of field (DOFs) of the first and second camera modules are selected from the group consisting of infinity to 60 centimeters (cm), 40 cm to 20 cm, and 20 cm to 10 cm;
the image processing unit is electrically connected to the camera modules, and is configured for comparing the modulation transfer function (MTF) values of the two images captured by the first camera module and the second camera module, and transmitting data of the image having the greatest MTF value to the storage unit;
the storage unit is electrically connected to the image processing unit and the display, and is configured for storing the data of the image having the greatest MTF value, and transferring the data of the image having the greatest MTF value to the display; and
the display is capable of displaying only the image having the greatest MTF value.

2. The portable electronic device of claim 1, wherein the camera modules are at the same side of the main body, and the display is at an opposite side of the main body.

3. The portable electronic device of claim 1, wherein the camera modules and the display are at the same side of the main body.

4. The portable electronic device of claim 1, wherein the DOF of the first camera module is from infinity to 60 cm, and the DOF of the second camera module is from 40 cm to 20 cm.

5. The portable electronic device of claim 1, wherein the camera modules further comprise a third camera module, and the depths of field (DOFs) of the first, second and third camera modules are infinity to 60 cm, 40 cm to 20 cm, and 20 cm to 10 cm.

6. The portable electronic device of claim 1, wherein the image processing unit is configured for transmitting only data of the image having the greatest MTF value to the storage unit, and the storage unit is correspondingly configured for storing the data of the image having the greatest MTF value, and transferring the data of the image having the greatest MTF value to the display.

7. The portable electronic device of claim 6, wherein the camera modules are at the same side of the main body, and the display is at an opposite side of the main body.

8. The portable electronic device of claim 6, wherein the camera modules and the display are at the same side of the main body.

9. The portable electronic device of claim 6, wherein the DOF of the first camera module is from infinity to 60 cm, and the DOF of the second camera module is from 40 cm to 20 cm.

10. The portable electronic device of claim 6, wherein the camera modules further comprise a third camera module, and the depths of field (DOFs) of the first, second and third camera modules are infinity to 60 cm, 40 cm to 20 cm, and 20 cm to 10 cm.

11. A portable electronic device, comprising:
a main body;
at least two camera modules accommodated in the main body and exposed to the ambient environment, the at least two camera modules having different focal lengths from each other, being configured for simultaneously picking up images of a same object, and comprising a first camera module and a second camera module, wherein the depths of field (DOFs) of the first and second camera modules are selected from the group consisting of infinity to 60 centimeters (cm), 40 cm to 20 cm, and 20 cm to 10 cm;
electronic means for automatically comparing modulation transfer function (MTF) values of the two simultaneous images captured by the first camera module and the second camera module, and storing data of the image having the greatest MTF value; and
a display received in the main body and exposed to the ambient environment, the display capable of displaying only the image having the greatest MTF value.

12. The portable electronic device of claim 11, wherein the DOF of the first camera module is from infinity to 60 cm, and the DOF of the second camera module is from 40 cm to 20 cm.

13. The portable electronic device of claim 11, wherein the at least two camera modules further comprise a third camera module, and the depths of field (DOFs) of the first, second and third camera modules are infinity to 60 cm, 40 cm to 20 cm, and 20 cm to 10 cm.

14. The portable electronic device of claim 11, wherein electronic means is configured for storing only data of the image having the greatest MTF value.

15. The portable electronic device of claim 14, wherein the DOF of the first camera module is from infinity to 60 cm, and the DOF of the second camera module is from 40 cm to 20 cm.

16. The portable electronic device of claim 14, wherein the at least two camera modules further comprise a third camera module, and the depths of field (DOFs) of the first, second and third camera modules are infinity to 60 cm, 40 cm to 20 cm, and 20 cm to 10 cm.

* * * * *